Figure 1:
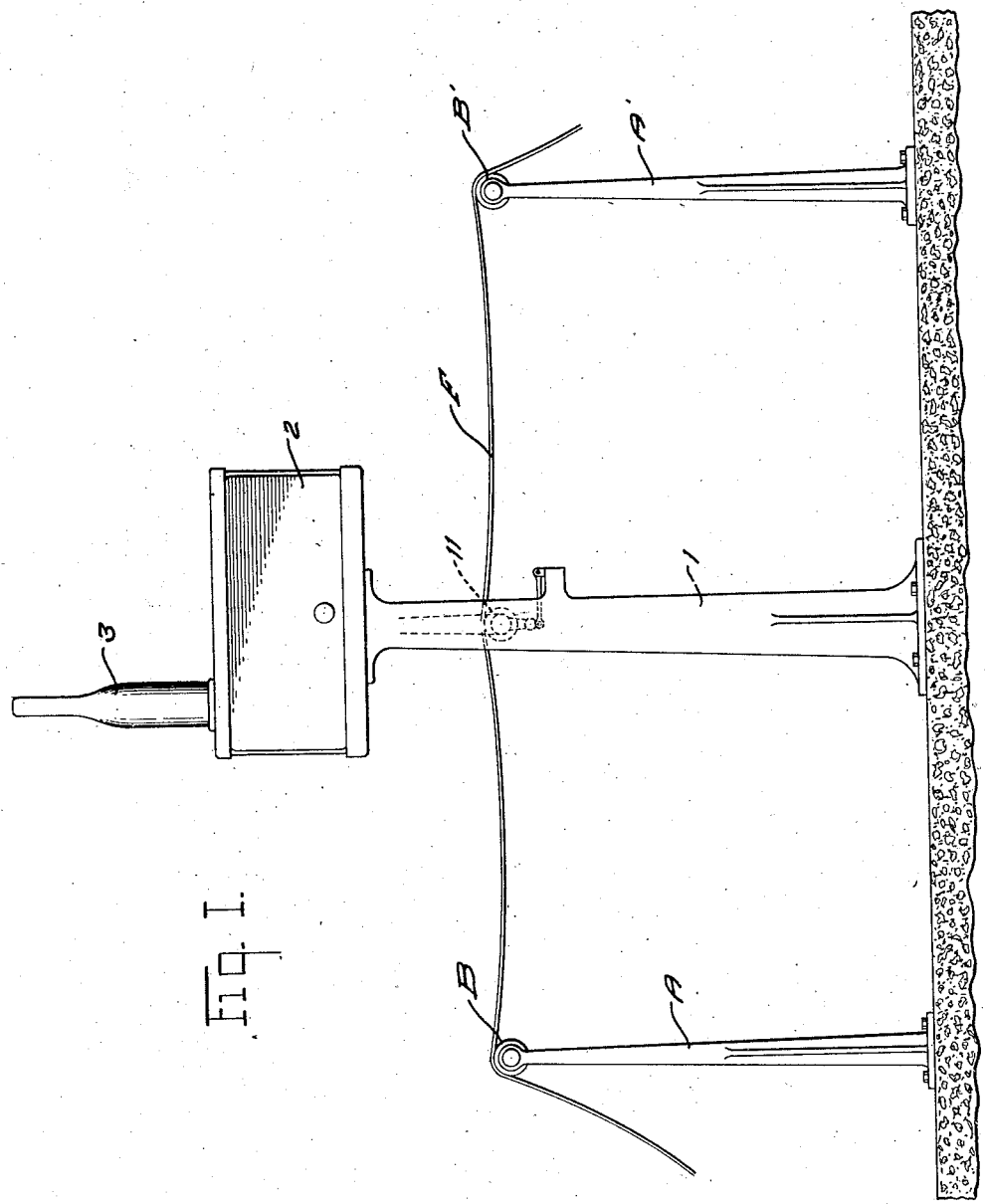

Aug. 23, 1927.

E. G. THOMAS
TESTING DEVICE
Filed Aug. 1, 1924

1,639,818

2 Sheets-Sheet 1

Inventor
Edward G. Thomas.

By C. O. Marshall
Attorney

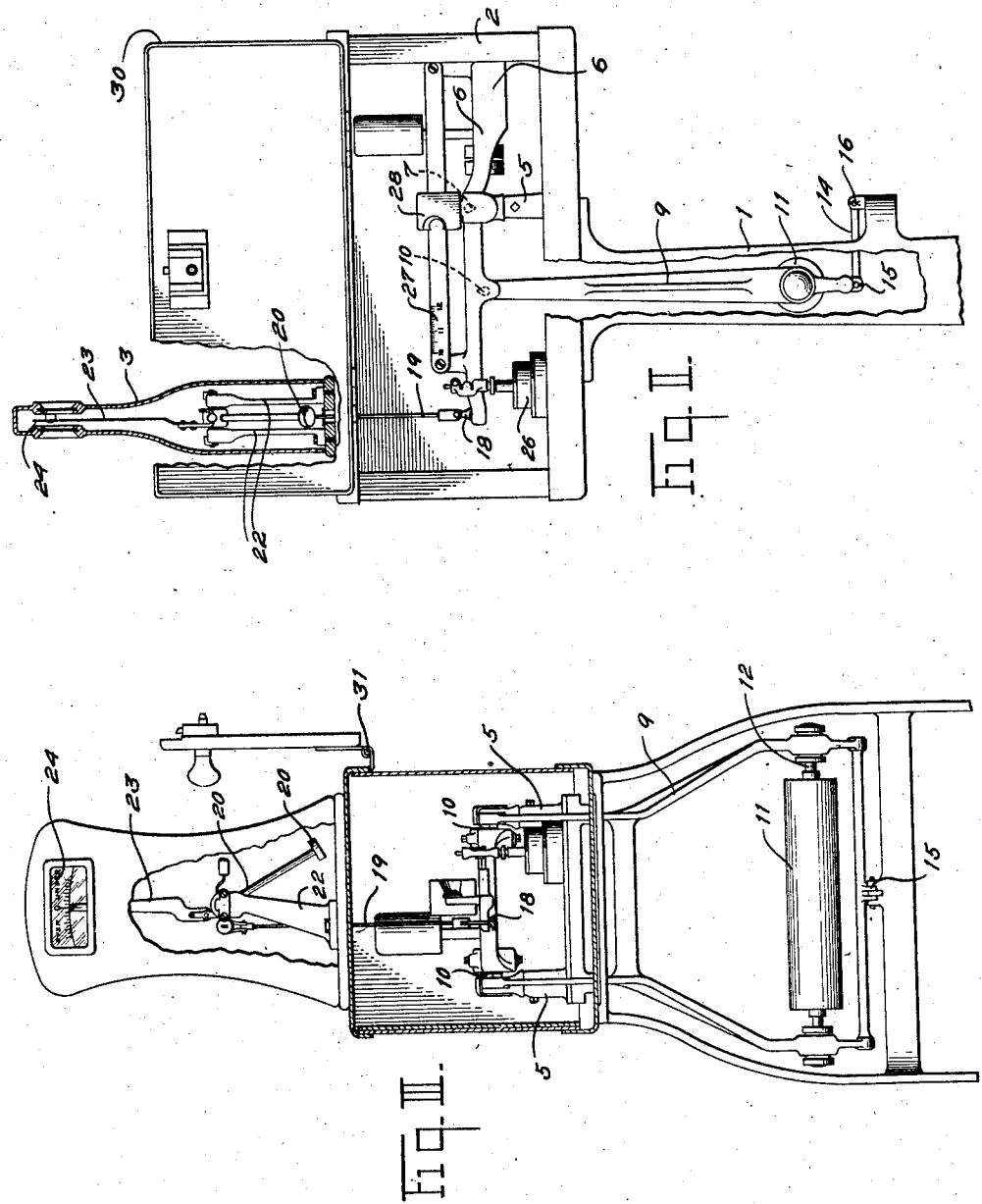

Patented Aug. 23, 1927.

1,639,818

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

TESTING DEVICE.

Application filed August 1, 1924. Serial No. 729,520.

This invention relates to devices for testing the weight per unit of length of pliable material in strip form. Machines for producing paper, thin sheet metal, coated fabrics and similar products are usually provided with means whereby the weight or thickness of the material produced may be increased or decreased. It is ordinarily very difficult, however, to detect small variations in the weight or thickness of the material until a considerable length has been produced and a machine for detecting such variations must be very sensitive and at the same time not influenced by changes in conditions other than changes in the weight of the material being tested. One of the principal objects of my invention is the provision of a very sensitive testing device which is not influenced by changes in the tautness of the strip being tested.

Another object is to provide a testing device of simple and compact construction having load-counterbalancing and indicating mechanism positioned directly above the strip supporting element so that the space occupied by the device is economized.

Another object is the provision of simple means for suspending the strip-supporting element directly from a pivot of the weighing mechanism.

Still another object is the provision of a simple, compact device of the character described which is of sturdy construction and in which the sensitive mechanism is protected by substantially tight casing.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a testing device embodying my invention, showing a strip of material to be tested in position thereon;

Figure II is an enlarged side elevational view of the testing device, parts being broken away and parts shown in section;

Figure III is a front elevational view of the testing device, the housing being shown in section and other parts broken away.

Referring to the drawings in detail, the strip of material F after emerging from the producing machine (not shown) is passed over a pair of parallel rollers B and B' which are rotatably supported in anti-friction bearings carried in the upper extremities of uprights or standards A and A'. Located midway between the standards A and A' is a pedestal 1 which is surmounted by a box-like housing 2 upon one end of which is supported an upright housing 3 which contains the automatic load-counterbalancing and indicating mechanism of the device. Within the box-like housing 2 is a pair of fulcrum stands 5 which support a main lever 6 through the medium of knife edge pivots 7 which are fixed in the lever 6.

A frame 9 is suspended from load pivots 10 which project from the lever 6, and carries a cylinder or roll 11, the roll 11 being mounted upon a shaft 12 which is journaled in anti-friction bearings in the frame 9.

For the purpose of preventing the frame 9 from swinging on the load pivots 10 its lower end is connected to the pedestal 1 by means of a check link 14 which is pivoted to the frame 9 at 15 and to the pedestal at 16. The length of the link is the same as the distance between the fulcrum and load pivots of the lever 6. The pivot 16 being preferably directly beneath the fulcrum pivot 7 of the lever, the fulcrum and load pivots and the pivots at the ends of the link 14 therefore lie in parallelogrammatic relation and the frame 9 remains vertical during all weighing movements, the axis of the roller 11 always lying directly beneath the axis of the load pivot 10.

The nose of the lever 6 is connected by means of a stirrup 18 and link 19 to a load-counterbalancing pendulum 20 which is mounted upon a pair of supports 22 fixed to the lower end of the upright housing 3, and fixed to the pendulum 20 is an indicator hand 23 which co-operates with a chart 24 to indicate variations over and under the normal weight of the strip as it passes over the roller 11.

A dash pot vibration damping device 26 having its plunger connected to the lever 6 serves to damp vibrations of the indicating mechanism while in operation.

In order that the device may be used for testing materials of widely varying weights without change of the mechanism, the lever 6 is provided with a graduated beam 27 upon which is slidably mounted a poise 28 which may be moved to position to counterbalance the major part of the weight of the load on the roller 11. The beam and poise are readily accessible through an opening in the side of the housing 2, which also gives access to the lever mechanism and dash pot. A cover 30 hinged to the housing at 31 serves to close the opening in the housing when the testing device is in use, and this cover may, if desired, be provided with a lock to prevent tampering with the mechanism or unauthorized shifting of the poise.

In the operation of the device a strip of material F is positioned on the rollers B, B' and 11 and the poise 28 is moved to position in which the indicator hand 23 will register with the predetermined weight mark "0" when the material is of the normal or required weight. With the indicator hand in this position the upper sides of the rollers B, B' and 11 are tangent to the same plane and the weight supported by the roller 11 is half the weight of the material between the rollers B and B'. With the rollers thus tangent to the same plane the share of the weight carried by the roller 11 remains the same regardless of the tautness of the strip of material, and changes in the tautness of the strip will not cause a change in the indication unless the change in tautness is sufficiently great to cause an appreciable change in the length of the strip between the rollers B and B'. Under the conditions in which the device is used the tension on the strip is very great as compared to the weight of the strip, so that it is always taut and no appreciable change in load results from variations in tension. Since the roller 11 supports half of the portion of the strip between the rollers B and B', any increase in the weight of the strip will depress the roller 11 and any decrease will allow it to be pulled upwardly by downward movement of the pendulum 20. Either movement of the roller 11 will be accompanied by movement of the indicator hand 23 away from the predetermined weight mark on the chart 24 so that the change in weight will be indicated and the necessary adjustments to bring the material back to the required weight may be made promptly.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a pedestal, a housing mounted thereon, load-counterbalancing and indicating mechanism within said housing, a frame suspended from said load-counterbalancing and indicating mechanism below said housing, and a roller supported by said frame and adapted to engage and support a portion of a strip of material to be tested.

2. In a device of the class described, in combination, a pedestal having an opening therein, load-counterbalancing and indicating mechanism supported on said pedestal, a frame suspended from said load-counterbalancing and indicating mechanism and hanging within said opening in said pedestal, and a roller supported by said frame and adapted to engage and support a portion of a strip of material to be tested.

3. In a device of the class described, in combination, a pedestal, housing means supported thereon, load-counterbalancing and indicating mechanism supported within said housing means, said housing means having an opening and a cover therefor to permit access to parts of said load-counterbalancing mechanism, a frame suspended from said load-counterbalancing mechanism, and a roller supported by said frame and adapted to engage and support a portion of a strip of material to be tested.

4. In a device of the class described, in combination, a pedestal, housing means supported thereon, load-counterbalancing and indicating mechanism within said housing means, said pedestal having an opening therein, a frame suspended from said load-counterbalancing mechanism and hanging within said opening, and a roller supported by said frame within said opening and adapted to engage and support a portion of a strip of material to be tested.

5. In a device of the class described, in combination, a pedestal, housing means supported thereon, load-counterbalancing and indicating mechanism within said housing means, said load-counterbalancing and indicating mechanism including a lever having a fulcrum and load pivot, a frame suspended from said lever and hanging beneath said housing means, a roller supported by said frame and adapted to engage and support a portion of a piece of fabric to be tested, and a check link connected to said frame and to said pedestal.

EDWARD G. THOMAS.